Patented Mar. 22, 1927.

1,622,127

UNITED STATES PATENT OFFICE.

FREDERICK C. ATKINSON, OF INDIANAPOLIS, INDIANA.

LEATHER DRESSING AND TANNING MATERIAL.

No Drawing. Application filed August 16, 1919. Serial No. 317,899.

This invention relates to new materials suitable for leather dressing and tanning, more especially to certain organic substances obtained from a variety of vegetable matters, such as woody or cellular products including corn cobs, cotton seed hulls, oat hulls, etc. It is among the objects of my invention to produce from such waste materials of relatively small value, a material having properties making it particularly suitable for use in a variety of industrial applications, such as for the dressing and filling of leather and as a reducing agent in processes such as the chrome tanning process.

In carrying the objects of my invention into effect I provide a process whereby substances, such as wood sugars and gums are at least partially hydrolyzed forming a mixture containing as an important constituent, pentose sugars, which I have found to be valuable in leather dressing and tanning.

It is well known that substances, such as corn cobs, etc., contain certain classes of compounds known as pentosans and the closely related bodies, and that boiling these waste products with neutral or acidified water either at atmospheric pressure or in an autoclave at elevated pressure yields a soluble extract which has adhesive properties and is almost completely insoluble in strong alcohol, such properties being characteristic of starch dextrin, and apparently this extract is a pentose compound analogous to dextrin of the hexose series.

I have found that upon more nearly complete hydrolysis, this dextrin like pentose compound is converted into a product almost completely soluble in strong alcohol, having practically no adhesive properties, and not drying to a firm solid as is characteristic of adhesives. This new hydrolytic product possesses the physical properties of a sugar such as glucose, but is not sweet, and is especially valuable in the leather industry.

The following is a specific example of the preparation of my new material:

I place the material such as corn cobs, preferably in a crushed state, in water in an autoclave. The mixture may then be slightly acidified by means of an acid, such as sulphuric, hydrochloric, acetic, etc., but preferably acetic acid. Since by the cooking or digesting at elevated temperature a considerable proportion of acetic acid is produced in the operation which aids in effecting the hydrolysis desired, the addition of acid to the material is usually unnecessary. The material is digested under pressure at a temperature of from 140° to 200° C., for a period of two to three hours. After the hydrolysis is more or less complete the aqueous extract is run out of the autoclave into a suitable container. The residue remaining is dumped out of the autoclave and pressed under high mechanical pressure, as in a filter press, to recover a further quantity of extract, which is mixed with the first extract. The aqueous mixture is then evaporated to a heavy, viscous syrup.

This syrupy solution of hydrolyzed carbohydrates comprising my new product is suitable for use in various industrial processes, as a dressing or filler for various kinds of leather and also as a reducing agent for chromates and dichromates in the chrome process of tanning and other similar uses.

Having thus fully described my said invention, what I claim as new and desire to secure by Letters Patent, is:

1. A hydrolyzed extract of corn cobs containing pentoses and soluble for the most part in strong alcohol, substantially as set forth.

2. Material obtained from corncobs suitable for leather treatment, comprising pentose sugars, substantially as set forth.

3. A process of producing material suitable for leather treatment comprising digesting corn cobs under pressure at a temperature of 140° to 200° C. from two to three hours, substantially as set forth.

4. As an agent in leather treatment, a non-adhesive extract of corncobs, substantially as set forth.

5. As a leather filling and dressing agent, an extract of corncobs containing pentoses, substantially as set forth.

In witness whereof, I have hereunto set my hand at Indianapolis, Indiana this 13th day of August, A. D. nineteen hundred and nineteen.

FREDERICK C. ATKINSON.